United States Patent Office 3,268,493
Patented August 23, 1966

3,268,493
VULCANIZABLE RUBBER COMPOSITIONS COMPRISING POLYMERIC FATTY AMINES AS ACCELERATORS
William B. Reynolds, Excelsior, and Stuart A. Harrison, Minneapolis, Minn., assignors to General Mills, Inc., a corporation of Delaware
No Drawing. Filed Dec. 19, 1961, Ser. No. 160,666
15 Claims. (Cl. 260—79.5)

This invention relates to vulcanized natural and synthetic rubber containing polymeric secondary amines and to the process of preparing said compositions.

Many attempts have been made in the past to increase the cure rate of unvulcanized rubber and to improve the physical characteristics of the cured products. A wide variety of accelerators and accelerator activators has been developed to speed the process of vulcanization, and antioxidants, fillers, pigments, softeners, lubricants, and the like have been added to give the cured rubber desirable physical properties. Most of the above additives have only one function. However, there are exceptions, i.e., stearic acid (softener or lubricant) and zinc oxide (filler) act as activators for mercaptobenzothiozole and tetramethylthiuramidisulfide accelerators, respectively. It is also known that low molecular weight amines such as aniline and triethylene tetramine accelerate the cure of rubber. However, these amines are volatile, toxic materials wihch tend to be lost in processing and are hazardous to use.

It is an object of this invention to provide a new method for vulcanizing natural and synthetic rubber. A further object is to produce rubber compositions having improved physical characteristics. Other objects will be apparent from the discussion which follows.

We have found that polymeric secondary amines characterized by the recurring structural unit:

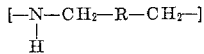

where R is a dimeric fat radical act as accelerators of rubber vulcanization, improve the abrasion resistance of the cured stock and the tackiness of the uncured stock. Said amines are also highly compatible with both natural and synthetic rubber, are nonvolatile, and thus are not lost during the milling and vulcanization process and serve to lubricate the stock so that it can be removed from the mold more readily.

The polymeric secondary amines are conveniently prepared by the condensation polymerization of a fatty dinitrile derived from a dimerized fat acid. In addition to the homopolymer products prepared by the homo-condensation of a fatty dinitrile, copolymer products can be prepared by the condensation copolymerization of a fatty dinitrile and a dinitrile copolymerizable therewith.

The condensation polymerization of the fatty dinitriles is accomplished by hydrogenating a fatty dinitrile under secondary-amine-forming conditions. By "secondary-amine-forming conditions" is meant that set of hydrogenation conditions under which a fatty nitrile preferentially forms a secondary amine rather than a primary amine. Secondary fatty amines are commercially available products and the conditions necessary to produce them are well understood in the art. Typical reaction conditions utilize hydrogen pressures in the range of 25 to 1000 p.s.i.g. at temperatures in the range of 200 to 290° C.

The preparative reaction is illustrated by the following equation:

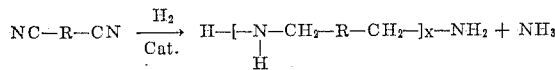

where R is a dimeric fat radical and X is the number of recurring units in the polymer chain. As illustrated in the equation, an ammonia by-product is formed. In order to obtain optimum yields of the desired polymer product, the ammonia by-product should be removed. Generally, this is done by "sweeping" the reaction mixture with hydrogen gas.

Depending on the reaction conditions employed, the polymer products will vary in molecular weight from dimers in which X in the foregoing equation is 2, to high molecular weight products in which X is 40 or greater. The molecular weight of the polymer product can be varied by selection of the reaction conditions. Mild reaction conditions tend to produce lower molecular weight polymers, while extremely severe reaction conditions produce insoluble cross-linked polymers. The lower molecular weight polymers are readily pourable, viscous liquids which resemble a heavy sirup. They are generally pale amber in color and are readily soluble in most common organic solvents. As the molecular weight increases, the products are generally more viscous, less soluble, and darker in color. Products in which X is about 20 are extremely viscous and are difficult to pour even when heated.

A hydrogenation catalyst is employed to carry out the condensation reactions. Generally, any nitrile hydrogenation catalyst can be employed. The preferred catalysts are Raney nickel and copper-chromate catalysts. Other suitable catalysts include Raney cobalt, platinum, palladium, palladium on charcoal, platinum on charcoal, nickel on keiselguhr, copper-nickel carbonate, cadmium-copper-zinc chromate, copper-nickel oxide, and the like.

The "copper-chromite catalyst" referred to above is often referred to as "copper-chromium oxide catalyst." Preparation of copper-chromite catalysts is discussed in an article by Connor, Folkers, and Adkins, in the Journal of the American Chemical Society, vol. 54, page 138–45 (1932) and in Reactions of Hydrogen With Organic Compounds Over Copper-Chromium Oxide and Nickel Catalysts by Homer Adkins, University of Wisconsin Press, Madison, Wisconsin (1937). The nature of this catalyst is further discussed in an article by Adkins, Burgoyne, and Schneider in the Journal of the American Chemical Society, vol. 72, pages 2226–29 (1950). Commercially available copper-chromite catalysts often contain amounts of catalyst stabilizers, e.g., barium oxide, calcium oxide, and magnesium oxide. Catalysts containing such stabilizers can be employed in the instant invention if desired. While many types of copper-chromite catalysts are commercially available and are generally useful in the instant invention, it is preferred to employ a catalyst containing 40 to 65% CuO (assuming all copper is present as CuO) and 35 to 60% $Cr_2O_3$ (assuming all chromium to be present as $Cr_2O_3$).

The amount of catalyst employed is not critical. However, the molecular weight and other properties of the polymer product will vary depending on the amount and type of catalyst used. Generally catalyst in the amount of 1 to 10% by weight, base on the weight of the nitrile charge, is sufficient for most purposes. Larger and smaller amounts of catalysts can be employed if desired.

The dinitrile starting materials for preparing the additives of the present invention are the dinitriles prepared from dimerized fat acids. Relatively pure dimerized fat acids can be distilled from commercially available polymeric fat acids mixtures. The term "polymeric fat radical" as used herein refers to the hydrocarbon radical of a polymeric fat acid. The term "polymeric fat acid" refers to a polymerized fat acid. The term "fat acid" as used herein refers to naturally occurring and synthetic monobasic aliphatic acids having hydrocarbon chains of 8-24 carbon atoms. The term "fat acids," therefore, includes saturated, ethylenically unsaturated and acetylenically unsaturated acids. "Polymeric fat radical" is generic to the divalent, trivalent, and polyvalent hydrocarbon radicals of dimerized fat acids, trimerized fat acids, and higher polymers of fat acids, respectively. These divalent and trivalent radicals are referred to herein as "dimeric fat radical" and "trimeric fat radical."

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize, but polymerization can be obtained at elevated temperatures with a peroxidic catalyst such as di-t-butyl peroxide. Because of the low yields of polymeric products, these materials are not commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthroquinone, sulfur dioxide, and the like. Suitable monomers include the branched and straight chain poly and mono ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid, and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid both straight chain and branched chain, both mono-unsaturated and polyunsaturated, are useful monomers for the preparation of the polymeric fat acids. Suitable examples of such materials include 10-undecynoic acid, tariric acid, stearolic acid, behenolic acid, and isamic acid.

Because of their ready availability and relative ease of polymerization, oleic and linoleic acid are the preferred starting materials for the preparation of the polymeric fat acids.

The dimerized fat acid is then converted to the corresponding dinitriles by reacting the dimerized fat acid with ammonia under nitrile-forming conditions. The details of this reaction are set forth in Chapter 2 of Fatty Acids and Their Derivatives by A. W. Ralston, John Wiley & Sons, Inc., New York (1948). If desired, the dinitrile may then be purified to the desired degree by vacuum distillation or other suitable means. Generally, the high purity dinitrile tends to produce linear polymers of high molecular weight. If appreciable amounts of mononitrile are present, the polymer will be of low molecular weight, since these materials act as chain-stoppers. The presence of trinitriles and other high polyfunctional nitriles tends to produce a cross-linked polymer. A sufficient amount of trinitriles will provide a gelled product.

Copolymers can be prepared by copolymerizing mixtures of dinitriles. The desired dinitrile comonomer is added to the reaction mixture along with the fatty dinitrile. After subjecting the mixture to polymerization conditions, there is obtained a copolymer having randomly distributed recurring units:

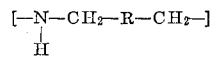

and

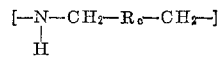

where R is a dimeric fat radical and $R_c$ is a divalent radical derived from the comonomer dinitrile. Generally, any copolymerizable dinitrile can be employed. Specific examples of simple nitriles which can be employed as comonomers include the dinitriles derived from such acids as adipic acid, pimelic acid, suberic acid, azelaic acid, and sebacic acid. Mixtures of two or more fatty dinitriles can also be copolymerized. A large variety of other dinitriles are likewise useful.

In theory, the formation of the polymeric amine proceeds through the preliminary reduction of the nitrile to the primary amine followed by conversion of the primary amine to the polymeric secondary amine. Accordingly, this provides an alternate route for the preparation of the polymers. In the alternate route, the polyamines are formed separately and then converted to the polymeric amines under the conditions previously described, although it is possible to use somewhat milder conditions. In this instance, it is possible to use a variety of other polyamines as comonomers including some comonomers such as metaxylylene diamines which may not be readily employed in the form of nitriles.

From a practical standpoint, there may be certain advantages in thus carrying out the preparation of the polymeric amines in two steps, since it makes possible the removal of any by-products formed in the first step, i.e., the formation of the primary amine and thus enhances the purity of the final product. In addition, the milder conditions used to form the polymeric amine from the di-primary amine results in less degradation and thus further enhances the purity of the final product.

Generally, the end groups of the polymeric secondary amines will be either amine groups or nitrile groups. Where the polymers are prepared by condensing amines, all the end groups will be primary amines:

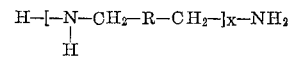

where R and X are as previously defined. Where a dinitrile is used as the starting material and the reaction conditions are mild and the reaction time is short, the end groups will be mainly nitrile groups:

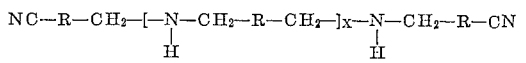

wherein R and X are as previously defined. When dinitriles are used as the starting material, under many reaction conditions a mixture of polymers will be obtained, some chains terminating in nitrile groups and other chains terminating in amine groups. Where severe reaction conditions are utilized the degradation of functional groups may cause some chains to terminate in hydrocarbon groups.

The preparation of the polymeric secondary amines will be better understood with respect to the following examples which illustrate certain preferred embodiments of the present invention.

*Example A*

Into a 1 liter stirred autoclave were charged 330 grams of distilled dimer nitrile prepared from vacuum stripped dimerized linoleic acid and 14.4 grams of water-wet Raney nickel catalyst. The autoclave was flushed with hydrogen, sealed under 150 p.s.i. hydrogen and rapidly heated to 200° C., at which time a continuous venting of hydrogen was begun such that the hydrogen coming into the autoclave was at 210 p.s.i. and the actual pressure in the autoclave was approximately 200 p.s.i. The hydrogenation was then run at 250° C. for a period of 5⅙ hours. After cooling and filtering to remove the catalyst, there was obtained a product having a Brookfield viscosity of 127 poises at 25° C. The product contained 9.4% primary amine groups, 74.6% secondary amine groups and 6.2% tertiary amine groups.

*Example B*

Into a 1 liter stirred autoclave were charged 417 grams of distilled dimer nitrile prepared from dimerized linoleic acid and 20 grams of a commercially available copper-chromite catalyst "G-13." The autoclave was flushed with hydrogen, sealed under 150 p.s.i. hydrogen, and rapidly heated to 200° C., at which time a continuous venting of hydrogen was begun such that the hydrogen coming into the autoclave was at 240 p.s.i. and the actual pressure in the autoclave was approximately 230 p.s.i. Heating was continued until the desired reaction temperature of 270° C. was reached. The hydrogenation was continued at this temperature for a period of 1⅓ hours. The reaction mixture was then cooled to below 200° C. and the catalyst was filtered off. There was obtained a product having a Brookfield viscosity of 4220 poises at 25° C., a molecular weight of 10,100, and an inherent viscosity of 0.262 as measured on a 5.0% solution in meta-cresol. The product contained 8.0% primary amine groups, 84.4% secondary amine groups, 5.1% tertiary amine groups, and no nitrile groups.

*Example C*

Example B was repeated except that the reaction time was increased to 2 hours. There was obtained a product having a Brookfield viscosity of greater than 20,000 poises at 25° C., a Brookfield viscosity of 6400 poises at 60° C., a molecular weight of 9900, and an inherent viscosity of 0.334 as measured on a 0.5% solution in meta-cresol. The product contained 7.0% primary amine groups, 81.4% secondary amine groups, 7.6% tertiary amine groups, and no nitrile groups.

The polymeric secondary amines and preparation thereof are further described in the copending application of Leonard R. Vertnik, Serial No. 136,426, filed September 7, 1961, now Patent 3,217,028.

The amines are useful as accelerators in the vulcanization of both natural and synthetic rubber. Thus, it is to be understood that the term "rubber" is employed herein and in the appended claims in a generic sense to designate rubbery materials which are vulcanizable with sulfur, including caoutchouc, balata, gutta percha, latex, rubber isomers, or synthetic rubber, including rubbery polymers of open-chain conjugated diolefins containing from 4 to 8 carbon atoms, such as butadiene-1,3, isoprene, chloroprene, 2,3-dimethyl butadiene-1,3, as well as rubbery copolymers of such dienes with materials copolymerizable therewith such as acrylonitrile, styrene, methyl acrylate, methyl methacrylate, methacrylonitrile, isobutylene, and other copolymerizable monomeric materials.

The amount of the polymeric secondary amine employed may vary according to the particular composition being treated and the particular desired characteristics of the cured products. Generally, the amount will be about 0.5% to about 15% by weight based on the rubber with 1-10% by weight being preferred.

The compositions of the present invention may also include other well-known ingredients such as pigments, fillers, softeners, lubricants, antioxidants, and the like. Examples of such additives are: fillers and pigments—carbon black, silica, zinc oxide, china clay, magnesium carbonate, antimony sulfides, ferric oxide, kieselguhr, talc and whiting; softeners and lubricants—stearic acid, waxes, mineral oils, tars and dioctyl phthalate; antioxidants—aromatic amines such as phenyl-β-naphthylamine and phenols such as p-hydroxydiphenyl.

Other known vulcanization accelerators may also be employed in combination with those of the present invention. Examples of such compounds are N-cyclohexyl-2-benzothiazole sulfenamide, thiazoline sulfenamides, thiocarbamyl sulfenamides, mercaptothiazoles such as mercaptobenzothiazole, mercaptothiazolines, thiazolyl mono- and di-sulfides, the N,N-disubstituted dithiocarbamates, the thiuram sulfides and metallic salts of mercaptothiazoles or mercaptothiazolines or dithiocarbamic acids. Accelerator activators such as derivatives of guanidine, amine salts of inorganic and organic acids, various amines themselves, and alkaline salts (sodium acetate) may also be used. Especially good results are obtained in the present invention by employing a combination of the polymeric secondary amines and mercaptobenzothiazole.

Vulcanization of the rubber compositions of the present invention is carried out in the manner well known by those skilled in the art. Either free sulfur or vulcanizing agents of the sulfur-donor type can be used. Known agents of the latter type include the various phenol polysulfides including the alkyl derivatives thereof, the xanthogen polysulfides, the thiuram disulfides and polysulfides, various amine sulfides including the dialkylamine polysulfides and reaction products of primary amines with excess sulfur. Vulcanization is usually accomplished at a temperature in the range of 240 to 400° F. for a time ranging from several hours to a few seconds.

The invention will be better understood with respect to the following examples which illustrate certain preferred embodiments of the present invention. Unless otherwise specified, all parts and percentages used herein are by weight.

*Example I*

Rubber compositions containing the following ingredients were prepared:

|  | A (Control) | B | C | D |
|---|---|---|---|---|
| Natural rubber (Smoked Sheets) | 100 | 100 | 100 | 100 |
| Stearic acid | 3 | 3 | 3 | 3 |
| Dioctyl phthalate | 1.5 | 1.5 | 1.5 | 1.5 |
| Phenyl-β-naphthylamine | 1.5 | 1.5 | 1.5 | 1.5 |
| Zinc oxide | 3 | 3 | 3 | 3 |
| Carbon black | 47.5 | 47.5 | 47.5 | 47.5 |
| Sulfur | 3 | 3 | 3 | 3 |
| Amine of Example A |  | 1 |  |  |
| Amine of Example B |  |  | 1 |  |
| Amine of Example C |  |  |  | 1 |

These compositions were vulcanized in a press using steam at a pressure of 40 p.s.i. for 60 and 90 minutes. Stress-strain tests were made on the vulcanized products and the results are set forth in the following Table I.

TABLE I

| Composition | Cure Minutes at 40 p.s.i. steam | 300% Modulus (lbs./sq. in.) | Ultimate tensile (lbs./sq. in.) | Elongation at break (percent) |
|---|---|---|---|---|
| A | 60 | 59.4 | 124 | 510 |
|   | 90 | 77.2 | 113.3 | 450 |
| B | 60 | 435 | 672 | 410 |
|   | 90 | 778 | 900 | 325 |
| C | 60 | 350 | 600 | 410 |
|   | 90 | 565 | 910 | 395 |
| D | 60 | 625 | 685 | 350 |
|   | 90 | 950 | 1,370 | 400 |

The above data show that the compositions containing the polymeric secondary amines were vulcanized in a lesser time than the control.

TABLE III

| Composition | Cure, min. at 40 p.s.i. steam | 300% Modulus (lbs./sq. in.) | Ultimate tensile (lbs./sq. in.) | Elongation at break (percent) | Order tackiness [1] |
|---|---|---|---|---|---|
| H | 60 | 1,550 | 2,285 | 483 | 1 |
| I | 60 | 2,260 | 2,550 | 363 | 1 |
| J | 30 | 1,000 | 1,532 | 383 | 3 |
|   | 60 |  | 1,198 | 210 |   |
| K | 30 | 1,518 | 1,625 | 350 | 2 |
|   | 60 |  | 1,945 | 180 |   |
| L | 30 | 2,120 | 2,375 | 350 | 1 |
|   | 60 | 2,468 | 2,560 | 325 |   |
| M | 30 | 765 | 2,100 | 600 | 4 |
|   | 60 | 1,315 | 3,035 | 400 |   |

[1] 1=most tacky; 4=least tacky (measured on uncured stock).

*Example II*

The following compositions were prepared and tested as in Example I. Results of the tests are set forth in Table II.

|  | E | F | G (Control) |
|---|---|---|---|
| GRS-1002 (styrenebutadiene rubber) | 100 | 100 | 100 |
| Stearic acid | 3 | 3 | 3 |
| Dioctyl phthalate | 1.5 | 1.5 | 1.5 |
| Phenyl-β-naphthylamine | 1.5 | 1.5 | 1.5 |
| Zinc oxide | 3 | 3 | 3 |
| Carbon black | 47.5 | 47.5 | 47.5 |
| Sulfur | 3 | 3 | 3 |
| Amine of Example A | 2 |  |  |
| Amine of Example C |  | 2 |  |

TABLE II

| Composition | Cure Minutes | Cure P.s.i. steam | 300% Modulus (lbs./sq.in.) | Ultimate tensile (lbs./sq.in.) | Elongation at break (percent) |
|---|---|---|---|---|---|
| E | 45 | 50 | 57 | 57 | 525 |
|   | 60 | 50 | 72 | 114 | 600 |
| F | 60 | 40 | 47 | 44 | 320 |
|   | 90 | 40 | 58 | 62 | 640 |
| G | 60 | 40 | 36 | 36 | 360 |
|   | 90 | 40 | 58 | 38 | 430 |

The data of Table II show that synthetic rubber containing the polymeric secondary amine is vulcanized at a faster rate than the control. The data of both Tables I and II show that the vulcanized rubber prepared in accordance with the present invention has desirable physical characteristics.

*Example III*

The polymeric secondary amines are particularly valuable when used in combination with mercaptobenzothiazole. The use of this combination produces a higher cure rate than would be expected and also produces an uncured product which has increased tackiness. This is shown by the data of Table III obtained from the following compositions:

The above examples show that the polymeric secondary amines accelerate the cure of both natural and synthetic rubber and give an unexpectedly high rate of cure when used in combination with mercaptobenzothiazole. Also, they improve the tackiness of the uncured synthetic stocks. Additionally, the fatty nature of the agents of this invention makes them highly compatible with all rubber stocks. The cured products are more readily removed from the molds due to the lubricating properties of the amines.

Although we have herein disclosed specific embodiments of our invention, we do not intend to limit ourselves solely thereto, but only to the extent indicated in the appended claims.

We claim:

1. A method for producing vulcanized rubber products having improved physical characteristics from a vulcanizing agent selected from the group consisting of sulfur and sulfur donor compounds and a sulfur vulcanizable material selected from the group consisting of natural and synthetic rubber comprising (1) incorporating in such material about 0.5 to 15% by weight of a polymer having the recurring structural unit,

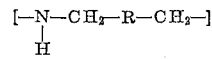

wherein R is the divalent hydrocarbon radical of a dimerized fat acid derived from a fat acid containing 8 to 24 carbon atoms, the end groups of said polymer being selected from amine groups, nitrile groups and hydrocarbon groups, and (2) vulcanizing the material.

2. A method as defined in claim 1 wherein the polymer has the structure:

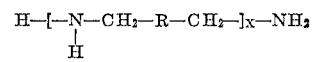

wherein X is the number of recurring units in the polymer chain.

3. A method as defined in claim 2 wherein X is an integer in the range of 2 to 40.

4. A method as defined in claim 2 wherein R is the divalent hydrocarbon radical of dimerized linoleic acid.

|  | H | I | J | K | L | M (Control) |
|---|---|---|---|---|---|---|
| GRS-1507 (styrene-butadiene rubber) | 100 | 100 | 100 | 100 | 100 | 100 |
| Stearic acid | 3 | 3 | 3 | 3 | 3 | 3 |
| Dioctyl phthalate | 1.5 | 1.5 | 1.5 | 1.5 | 1.5 | 1.5 |
| Phenyl-β-naphthylamine | 1.5 | 1.5 | 1.5 | 1.5 | 1.5 | 1.5 |
| Zinc oxide | 3 | 3 | 3 | 3 | 3 | 3 |
| Carbon black | 47.5 | 47.5 | 47.5 | 47.5 | 47.5 | 47.5 |
| Sulfur | 3 | 3 | 3 | 3 | 3 | 3 |
| Mercaptobenzothiazole | 1.0 | 1.0 | 1.0 | 1.0 | 1.0 | 1.0 |
| Amine of Example A | 10 |  |  |  |  |  |
| Amine of Example B |  | 10 |  |  |  |  |
| Amine of Example C |  |  | 1 | 5 | 10 |  |

5. A method as defined in claim 2 in which a small amount of a second accelerator is also incorporated into the vulcanizable material prior to the vulcanization thereof.

6. A method as defined in claim 5 wherein the second accelerator is mercaptobenzothiazole.

7. A method for producing vulcanized rubber products having improved physical characteristics from a vulcanizing agent selected from the group consisting of sulfur and sulfor donor compounds and a sulfur vulcanizable material selected from the group consisting of natural and synthetic rubber comprising (1) incorporating in such material from about 0.5 to 15% by weight of a polymeric condensation product of an aliphatic diprimary diamine wherein the aliphatic group is the divalent hydrocarbon radical of a dimerized fat acid derived from a fat acid containing 8 to 24 carbon atoms and (2) vulcanizing the material.

8. A method for producing vlucanized rubber products having improved physical characteristics from a vulcanizing agent selected from the group consisting of sulfur and sulfur donor compounds and a sulfur vulcanizable material selected from the group consisting of natural and synthetic rubber comprising (1) incorporating in such material from about 0.5 to 15% by weight of a polymeric secondary amine, said amine having been prepared by hydrogenating an aliphatic dinitrile under secondary-amine-forming conditions, the aliphatic group of the dinitrile being the divalent hydrocarbon radical of a dimerized fat acid derived from a fat acid containing 8 to 24 carbon atoms, and (2) vulcanizing said material.

9. A method for producing vulcanized rubber products having improved physical characteristics from a vulcanizing agent selected from the group consisting of sulfur and sulfur donor compounds and a sulfur vulcanizable material selected from the group consisting of natural and synthetic rubber comprising (1) incorporating in such material from about 0.5 to 15% by weight of a copolymer having the randomly distributed recurring units,

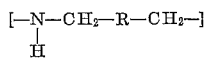

and

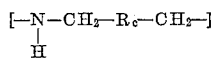

wherein R is the divalent hydrocarbon radical of a dimerized fat acid derived from a fat acid containing 8 to 24 carbon atoms and $R_c$ is the divalent hydrocarbon radical of a copolymerizable dinitrile, the end groups of said polymer being selected from amine groups, nitrile groups and hydrocarbon groups, and (2) vulcanizing the material.

10. The vulcanized rubber product produced by the process of claim 1.

11. The vulcanized rubber product produced by the process of claim 4.

12. The vulcanized rubber product produced by the process of claim 6.

13. The vulcanized rubber product produced by the process of claim 9.

14. A vulcanizable composition comprising a sulfur vulcanizable material selected from the group consisting of natural and synthetic rubber, a vulcanizing agent selected from the group consisting of sulfur and sulfur donor compounds and a polymer having the recurring structural unit,

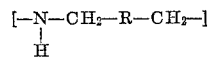

wherein R is the divalent hydrocarbon radical of a dimerized fat acid derived from a fat acid containing 8 to 24 carbon atoms, the end groups of said polymer being selected from amine groups, nitrile groups and hydrocarbon groups, the amount of the polymer in the vulcanizable composition being about 0.5 to 15% by weight based on the weight of the sulfur vulcanizable material.

15. A vulcanizable composition comprising a sulfur vulcanizable material selected from the group consisting of natural and synthetic rubber, a vulcanizing agent selected from the group consisting of sulfur and sulfur donor compounds and a polymer having the structure,

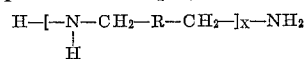

wherein R is the divalent hydrocarbon radical of a dimerized fat acid derived from a fat acid containing 8 to 24 carbon atoms and X is an integer in the range of 2 to 40, the amount of the polymer in the vulcanizable composition being about 0.5 to 15% by weight based on the weight of the sulfur vlucanizable material.

References Cited by the Examiner

UNITED STATES PATENTS

| | | | |
|---|---|---|---|
| 1,948,317 | 2/1934 | Sebrell | 260—798 |
| 2,335,059 | 11/1943 | Harman | 260—798 |
| 2,457,335 | 12/1948 | Williams et al. | 260—23.7 |
| 2,491,913 | 12/1949 | Amberg | 260—795 |
| 2,520,735 | 8/1950 | Ralston et al. | 260—23.7 |

OTHER REFERENCES

Breckley, India Rubber World, 114, 663–5 (1946).

LEON J. BERCOVITZ, *Primary Examiner.*

ALFONSO D. SULLIVAN, *Examiner.*

R. WHITE, T. D. KERWIN, *Assistant Examiners.*